Oct. 11, 1960 R. A. JENSEN 2,955,756

SERIAL WORD CHECKING CIRCUIT

Filed Dec. 9, 1955 3 Sheets-Sheet 1

INVENTOR.
ROBERT A. JENSEN

BY Paul M Erlow

AGENT

Oct. 11, 1960 R. A. JENSEN 2,955,756

SERIAL WORD CHECKING CIRCUIT

Filed Dec. 9, 1955 3 Sheets-Sheet 2

*INVENTOR.*
ROBERT A. JENSEN

*BY* Paul M Enlow

AGENT

SERIAL WORD CHECKING CIRCUIT

Filed Dec. 9, 1955 3 Sheets-Sheet 3

*INVENTOR.*
ROBERT A. JENSEN

*BY* Paul M Enlow

AGENT

United States Patent Office 2,955,756
Patented Oct. 11, 1960

2,955,756

SERIAL WORD CHECKING CIRCUIT

Robert A. Jensen, Flushing, N.Y., assignor to International Business Machines Corporation, New York, N.Y., a corporation of New York Filed Dec. 9, 1955, Ser. No. 552,066

4 Claims. (Cl. 235—153)

This invention relates to checking circuits for use in a high speed digital computer, and more particularly to checking circuits used in conjunction with a calculator or auxiliary equipment wherein the digital words are transmitted in a serial fashion.

In the electronic computer art it is known to provide diagnostic code and checking systems and electronic circuits which serve to authenticate the validity of a transfer of information elements, representing a plurality of digits, from one location in the computer to another. The plurality of digits are generally referred to as a digital word of information, or simply a word. One well-known type of checking system provides for the association with each word of a check digit or indicator which bears a predetermined relationship to the composition of the word. A word contains an error if upon examination the predetermined relationship between the representation of the check digit and the representation of the word is found to be lacking.

Digital computing machines, digital telemetering systems and telegraph systems frequently employ the use of discrete pulses or electrical signals to represent digits or elements of a digit. For example, the binary system of notation is frequently employed wherein each pulse or signal is generally considered as representing a binary bit which may have a value of 0 or 1. The check digit or indicator referred to above, which is associated with a word, is generally determined by a mathematical process which includes a determination of the number of binary bits or elements present in the word. When a word is transmitted throughout the electrical apparatus the accidental loss or gain of pulses destroys the predetermined relationship previously established between the composition of the word and the inventory check digit. In such a case the word is said to contain an error which may exist in the signals representing the word or in the signals representing the check indicator.

The present invention provides circuitry for examining a word and its check digit available serially, that is, digit by digit, and determines if the check digit or indicator is in agreement with the composition of the word. The invention further examines the check digit, the digits of the word and digits which may exist between words and renders an error signal if they are respectively greater than predetermined values.

When the checking circuit disclosed herein receives a word to be checked, a check digit is already associated with said word. Generally, the value of the check digit is determined prior to inserting the word into a computer with which the current invention is associated.

Each word to be checked by the present invention is composed of a plurality of digits expressed in a binary-decimal system of notation and where the digits appear serially but the individual bits comprising each digit appear in parallel. Accordingly, the present invention is characterized as checking the agreement of a word and the check digit associated therewith where the word appears at a given set of terminals in a serial fashion.

Thus this invention is distinguished from application Serial No. 434,548 entitled "Checking Circuit" by Deerhake et al. and filed June 4, 1954. The invention set forth in the latter application comprises circuitry for checking the agreement of a check digit and the word associated therewith where the word and its check digit appear in parallel, that is, parallel by digit and parallel by bits comprising each digit.

Briefly, the invention disclosed herein provides circuitry for receiving a check digit and advancing a ring counter to a position corresponding to the decimal value of said check digit. Thereafter, as each digit of the word is received the counter is advanced one position for each binary bit present in each digit. After the binary digits of a word have been received and the counter suitably advanced, the counter stands at a predetermined position which indicates that the check digit and the word associated therewith are in agreement.

Frequently, where a plurality of words are read serially from a source such as a magnetic tape or drum, adjacent words are separated from each other by an end-of-word character. The present invention examines an end-of-word character and renders an error signal if it is not a predetermined value. In addition, the invention examines each of the digits of a word to insure that each digit does not have a value greater than 9 and examines each check digit to insure that the value thereof is not greater than a predetermined magnitude. Furthermore, the invention includes circuitry which prohibits the rendition of an error signal when no significant data is being supplied to the circuit.

The invention indicates that the word and the check digit examined are in agreement if at the conclusion of the checking procedure the counter stands at a position corresponding to the decimal digit 3. This procedure is accomplished by entering the check digit into the counter and adding thereto the sum modulo 4 of the actual number of bits contained in the word. The resultant sum modulo 4 is 3 if the word and the check digit corresponding thereto are in agreement.

Accordingly, one of the objects of the present invention is to provide electronic circuit means capable of checking the accuracy of a word available serially and expressed in binary or binary-decimal notation.

Another object is to provide an electronic circuit for checking the composition of a word and the check indicator associated therewith to determine if they are in agreement by adding the decimal value of said indicator to the sum modulo 4 of the number of bits contained in said word.

A further object of the invention is the provision of electronic circuit means for detecting a value greater than 9 in a word or detecting a check digit having a value greater than 3 and for detecting an end-of-word character which is not a character 12 or 13.

An additional object is to provide electronic circuitry including a ring counter for determining whether a word and the check indicator associated therewith are in agreement wherein the decimal value of said indicator is entered into the counter and thereafter the counter is advanced one position for each binary bit contained in said word.

Another object is to provide a novel checking circuit for determining if a multi-order digital word and the check digit associated therewith are in agreement and for determining if each of the digits and said check digits are of appropriate magntiudes.

A still further object is to provide a novel checking circuit operable in conjunction with a synchronized electronic calculator or auxiliary equipment for determining the accuracy of multi-order words received in a serial fashion.

Other objects of the invention will be pointed out in the following description and claims and illustrated in the accompanying drawings, which disclose, by way of example, the principle of the invention and the best mode, which has been contemplated, of applying that principle.

*Definitions*

Figure 1:
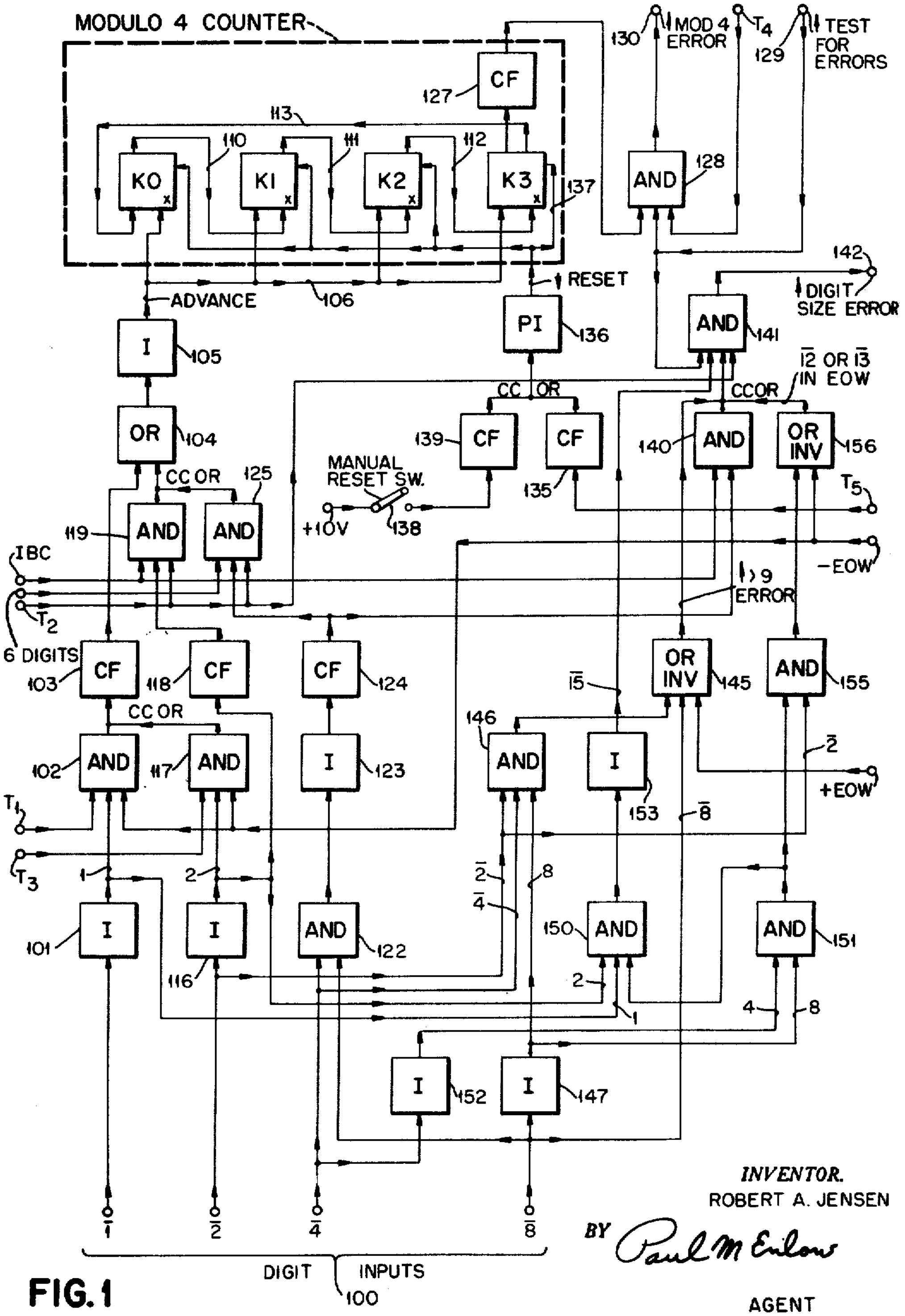
Fig 1 shows a block diagram of the logical circuitry of the invention.

In the following description of the invention, the binary-decimal system of notation is used, where a decimal digit is represented by the presence of one or more of four binary bits which are assigned the values 1, 2, 4 and 8. For example, the digit 9 is written in binary-decimal notation as 1001 where the extreme right-hand binary order represents a value of 1 when a binary 1 is present, and the extreme left-hand binary order represents a value of 8 when a binary 1 is present. Accordingly, the digit 49 is written in binary-decimal notation as 0100 1001. Generally, the binary-decimal system of notation as used herein precludes the representation of a decimal digit having a value greater than 9 by said four binary bits. However, in certain instances this rule is abrogated by representing a 12 by the simultaneous presence of binary 1's representing the 8 and 4 bits, and a 13 is represented by the simultaneous presence of the 8, 4 and 1 bits.

The term "digit position" frequently abbreviated as "DP" is used to refer to a digital order of a data word or of a device such as a register for accommodating or storing a single digital order of a word. Although a data word may contain any number of positions, the device disclosed herein is described with relation to data words having seventeen digit positions where DP1 through DP16 are occupied by decimal digits and DP17 is occupied by a check digit which is the indicated bit count factor referred to below.

The term "bit count" refers to the actual number of binary 1's which are present in a data word without regard to the decimal values 1, 2, 4 and 8 which are assigned to the individual bits. The term "indicated bit count" is defined as the 3's complement of the bit count modulo 4 of the number of binary 1's in digit positions 1 through 16 of a data word. For example, if DP1–DP16 of a data word contains nineteen binary 1's, the bit count is 19, the bit count modulo 4 is equal to 3 and the 3's complement of 3 is 0. Thus, in this example, the indicated bit count is zero so that a 0 should be located in DP17 of that data word.

Various circuits used herein or particular points within the circuits are frequently referred to as UP or DOWN. UP means that the voltage present at the particular point or at the output of the circuit designated is generally positive with respect to ground potential, or higher than that provided when the point is DOWN. DOWN means that the voltage present at the particular point or at the output of the circuit designated is negative with respect to ground potential, or below that provided when the circuit is UP. In most cases when a signal is UP, it is at approximately +10 volts, whereas when it is DOWN, it is at approximately −30 volts. If a particular vacuum tube anode circuit is being discussed, a signal is UP when it is at approximately +150 volts, whereas when it is DOWN, it is at approximately −50 volts.

*Introduction*

In general, the present invention illustrated in Fig. 1 performs two types of checks on each word that is serially applied thereto. Firstly, the invention performs a modulo 4 type check to determine if the indicated bit count is in agreement with the composition of the word. Secondly, the invention performs a digit size check to determine that the value of the indicated bit count is not greater than 3 (i.e., 1 bit and 2 bit), that the value of each digit of the word is not greater than 9, and that the value of an end-of-word character is a 12 (8 bit and 4 bit), or a 13 (8 bit, 4 bit and 1 bit).

The first check referred to above, is performed by adding the value of the indicated bit count to the sum modulo 4 of the actual number of bits present in the word. The resultant sum thereof is 3 if the indicated bit count and the word are in agreement. For example, the decimal quantity 63421, when expressed in binary-decimal notation, is written as 0110, 0011, 0100, 0010, 0001. This quantity contains seven binary 1's and therefor the actual bit count is 7. From the definition of the indicated bit count, it is apparent that the indicated bit count of the quantity 63421 is 0 since the 3's complement of 7 modulo 4 is 0.

Applying the modulo 4 type check to the above-mentioned example, it is apparent that 0 (the indicated bit count) plus 3 (modulo 4 value of 7) is equal to 3. Thus the check digit and the word associated therewith are in agreement.

The present invention may operate in conjunction with an electronic computer wherein the words appear serially and adjacent words are separated by an end-of-word character which may be a 12 or a 13. The second check referred to above as the digit size check, examines the check digit to determine if the value thereof is greater than 3, examines each digit of a word to determine that none of them have a value greater than 9, and examines each end-of-word character to determine if the value thereof is 12 or 13. If the magnitudes of any of the above-mentioned digits or characters are in error, the checking circuit produces a signal referred to as a digit size error signal.

The operation of the present invention is synchronized with the operation of the electronic calculator as, for example, disclosed and claimed in application Serial No. 547,981, filed November 21, 1955 by Havens et al., or the auxiliary card-tape-card machine disclosed and claimed in application Serial No. 471,244, filed November 26, 1954 by Weidenhammer. That is, timing waveforms are supplied to the novel checking circuit by external apparatus which indicate, for example, that the first digit received during a cycle is an end-of-word character, that the second digit received is the indicated bit count or check digit, and that the various digit comprising a word are being received. At the conclusion of a cycle during which a word is being checked, the calculator or auxiliary apparatus applies appropriate timing signals to the novel checking circuit for sensing the status of the ring counter to determine if the counter contains a value corresponding to the digit 3.

It is to be noted that a word wherein each of the digits thereof is a 0, the indicated bit count associated with the word must be a 3 since the 3's complement of 0 modulo 4 is 3. This type of word is to be distinguished from the situation arising where no data is applied to the checking circuit.

When the present invention is utilized, for example, in conjunction with the apparatus of application Serial No. 471,244, the absence of significant data is manifested at digit input terminals 100 of Fig. 1 by the appearance thereon of a character 15 (8, 4, 2 and 1 bits present) during each time interval that a digit would normally be received. In other words, when no significant data is being applied to said input terminals, the digit position occupied by the indicated bit count and the digit positions of each of the digits of a word is occupied by the character 15. The reason for the character 15 appearing at the digit input terminals 100 when no significant data is being applied thereto, is that the circuit supplying information to the novel checking circuit operates in a manner such that the terminals $\bar{1}$, $\bar{2}$, $\bar{4}$ and $\bar{8}$ of Fig. 1 are normally DOWN unless a binary 0 is present. That is, if an 8 bit, for example, is not present, the circuit reacts so as to cause the terminal $\bar{8}$ to be UP; otherwise, the terminal remains DOWN. Thus when the external circuit which is feeding information to the novel checking circuit is not receiving significant data, each of the digit input terminals 100 remains DOWN. The fact that each of these input terminals are DOWN indicates to the novel checking circuit that the character 15 is being applied thereto.

When the novel checking circuit performs a modulo 4 check, it does not recognize a 4 or an 8 bit during the time interval that the indicated bit count is normally applied thereto. In addition, the circuit does not recognize the difference between a 4 bit or an 8 bit but only recognizes that one or the other or both of them is present during the time intervals that each of the digits of a word is applied thereto.

Considering these limitations for the moment, a word having a character 15 in the indicated bit count position will appear to have an indicated bit count of 3 (4 and 8 bits are ignored). If each of the sixteen digit positions is occupied by a character 15, the actual bit count will appear to the novel checking circuit as 3×16 or 48 bits. The correct indicated bit count of a word having 48 bits is 3. Hence, when the novel checking circuit receives such a word, the modulo 4 check will not indicate an error. However, since the character 15 in the indicated bit count position of this word is actually greater than 3 and since each of the remaining digits have a value greater than 9, a digit size check would indicate an error.

In order to prohibit the novel checking circuit from rendering an error signal when each of the positions of the word and the indicated bit count is occupied by a character 15, the circuit includes circuitry for sensing the appearance of a 15 and in response thereto to delete the error signal.

The reason for constructing the circuit of Fig. 1 in a manner such that it does not recognize the difference between a 4 bit and no 8 bit, an 8 bit and no 4 bit, and an 8 bit and a 4 bit, is to simplify the circuitry of the checking circuit. It is apparent that additional circuitry would be required to sense these various conditions. However, as described above, the limitations inherent in not separately examining the presence of the 4 bit and 8 bit is overcome by the inclusion of a circuit which senses the presence of the character 15 in a word representing the absence of significant data.

It is to be understood however, that if the novel checking circuit of Fig. 1 is used in conjunction with a calculator or other auxiliary apparatus wherein the absence of significant data is represented by each of the digit input terminals being UP, the circuit referred to above which senses the character 15 may be replaced by a circuit which senses the presence of the decimal digit 0 (1, 2, 4 and 8 bits absent).

*Logical circuit components*

Figures 4, 4A:
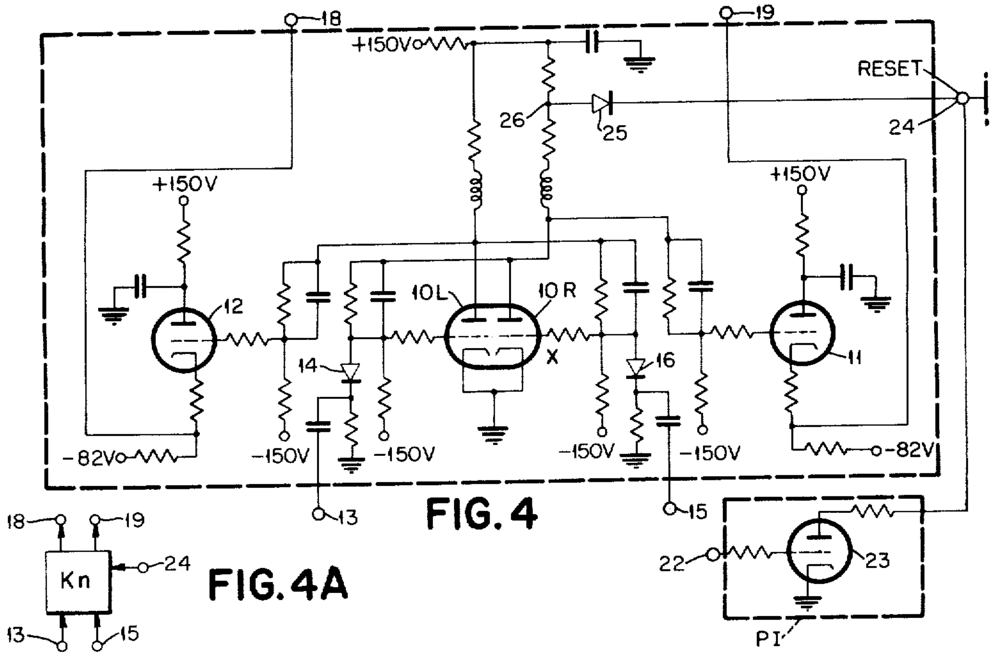
Fig. 4 shows a circuit diagram of a trigger circuit used in the invention.
Fig. 4A illustrates the symbol used herein to represent the trigger circuit of Fig. 4.

Referring more particularly to Fig. 4, a circuit diagram of a trigger circuit is illustrated. Although the trigger circuit of Fig. 4 is used in the invention described hereinafter, it is to be understood that the invention may be practiced using any conventional Eccles-Jordan type trigger circuit or bistable device.

The trigger circuit includes trigger tubes 10L and 10R and cathode followers 11 and 12. The control grid of each trigger tube is coupled to the plate of the opposite trigger tube in a conventional manner well known in the art. The left-hand input terminal 13 is capacitively coupled through diode 14 to the control grid of tube 10L and the right-hand input terminal 15 is capacitively coupled through diode 16 to the control grid of tube 10R. The plate of trigger tube 10L is directly coupled to the control grid of cathode follower 12. The cathode load of this cathode follower is tapped and connected to the left-hand output terminal 18. Similarly, the plate of trigger tube 10R is directly coupled to the control grid of cathode follower 11 and a tap on the cathode load of the latter tube is connected to the right-hand output terminal 19.

The trigger circuit is normally reset so that tube 10R is conductive as indicated by the large X adjacent thereto, and tube 10L is non-conductive. Accordingly, the voltage at the plate of tube 10R is DOWN thereby rendering cathode follower 11 less conductive so that the signal on output terminal 19 is DOWN. The plate of tube 10L is then UP rendering cathode follower 12 highly conductive so that output terminal 18 is UP. When the trigger circuit is reset (10R conducting), the application of a negative pulse to input terminal 13 has no effect on the trigger tubes. However, the application of a negative pulse to terminal 15 causes a negative pulse to be applied to tube 10R whereupon a transfer of conduction occurs within the trigger circuit. After the transfer of conduction takes place, tube 10L is conductive, tube 10R is non-conductive, and thus output terminal 18 is DOWN and output terminal 19 is UP. In other words, a transfer of conduction takes place in the trigger circuit whenever a negative pulse is applied to the input terminal associated with the trigger tube that is presently conductive. The cathode followers 11 and 12 merely serve to isolate the plate circuits of the trigger tubes from loads that are connected to output terminals 18 and 19.

The trigger circuit is reset by causing terminal 22, which is connected to the control grid of tube 23, to be UP. Tube 23 is connected as a power inverting circuit where the cathode thereof is connected to ground and the plate is connected through a load resistance to the reset terminal 24. The application of a positive signal to terminal 22 renders power inverter 23 conductive so that the signal applied to terminal 24 goes DOWN. The negative pulse on terminal 24 renders isolation diode 25 conductive to decrease the voltage at juncture 26. The fact that juncture 26 goes DOWN, forces tube 10R to become conductive regardless of the previous condition of the trigger circuit. It will be noted hereinbelow with respect to the circuit of Fig. 1, that Pullover Inverter PI of Fig. 4 is used to reset a plurality of trigger circutis.

The trigger circuit of Fig. 4 is represented in Fig. 1 by the smybol shown in Fig. 4A.

Figures 5, 6:
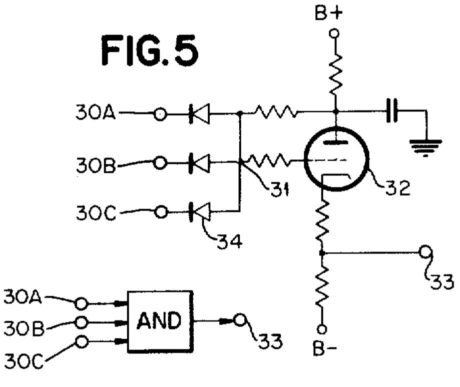
Fig. 5 illustrates a circuit diagram of an AND circuit.
Fig. 6 illustrates the symbol used to represent the AND circuit of Fig. 5.

Referring more particularly to Fig. 5, an AND circuit is illustrated which is a logical coincidence type circuit having a plurality of input terminals and a single output terminal. When all the input terminals, 30A–30C, are UP simultaneously, cathode follower 32 is rendered highly conductive causing the output terminal 33 to be UP. However, if one or more of the input terminals is DOWN, the output terminal must be DOWN. The number of input terminals associated with a particular AND circuit may be increased by providing a diode such as diode 34 for each additional input where the anode of said diode is connected to the juncture 31. The AND circuit of Fig. 5 is represented hereinafter by the symbol shown in Fig. 6.

Figures 2, 3:
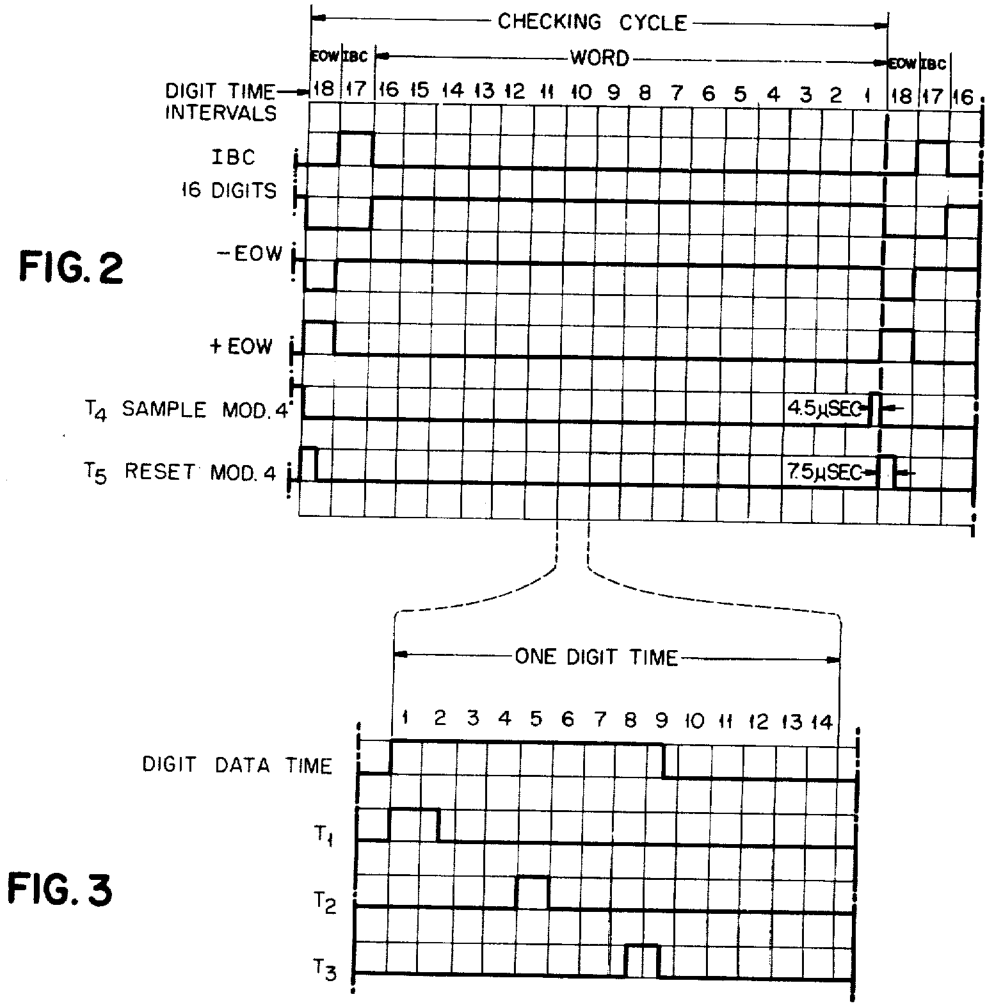
Fig. 2 shows a timing chart of a checking cycle.
Fig. 3 illustrates a timing chart of each digit time of a checking cycle.
Figures 7, 8:
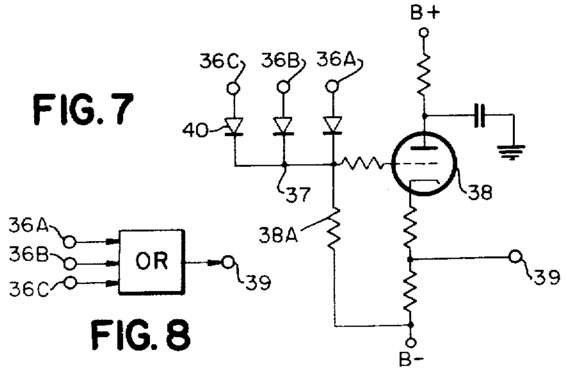
Fig. 7 shows a circuit diagram of an OR circuit.
Fig. 8 illustrates the symbol used to represent the OR circuit of Fig. 7.

Fig. 7 illustrates an OR circuit which is a logical circuit component having a plurality of inputs and a single output. The output terminal 39 of Fig. 3 is UP when one or more of the inputs 36A–36C are UP. If all the inputs of the OR circuit are DOWN, juncture 37 of Fig. 7 is DOWN rendering cathode follower 38 less conductive so that output terminal 39 thereof is DOWN. The number of inputs to a particular OR circuit may be increased by adding a diode such as diode 40 for each input. Hereinafter, each OR circuit is represented by the symbol illustrated in Fig. 8.

The logical circuitry of the invention frequently employs cathode followers which are similar to the cathode follower 38 of Fig. 7. In Fig. 1, a cathode follower is illustrated by a block containing the initials "CF" and having an input terminal and an output terminal. The input of a cathode follower corresponds to point 37 of Fig. 7 (assuming the diodes and resistor 38A shown are not present) and the output terminal corresponds to terminal 39 of Fig. 7. The cathode follower circuit is a non-inverting type circuit operable to produce a positive voltage at the output thereof whenever its input has a positive voltage applied thereto. Conversely, when the input of a cathode follower is DOWN, the tube is rendered less conductive causing the output to be DOWN. A cathode follower is generally used for isolation purposes or as a current driving unit when a particular signal source cannot supply the necessary current.

Figure 9:
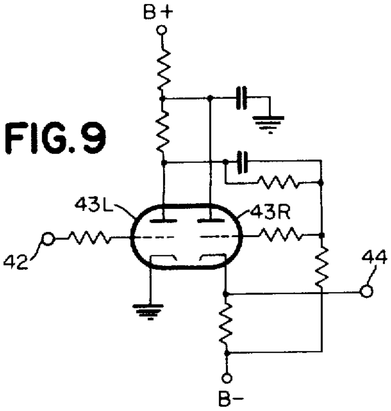
Fig. 9 illustrates a circuit diagram of an inverting circuit.
Figure 10:
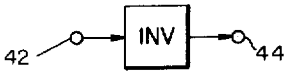
Fig. 10 shows the symbol used to represent the inverter of Fig. 9.

A typical inverting circuit is illustrated in Fig. 9 which is used to invert an UP signal to a DOWN signal, or a DOWN signal to an UP signal. When input 42 of Fig. 9 is UP, for example, inverter 43L is rendered highly conductive causing the plate thereof to be DOWN. The DOWN voltage at the plate is direct coupled to the control grid of cathode follower 43R rendering tube 43R less conductive so that output terminal 44 is DOWN. When input terminal 42 is DOWN for example, inverter 43L is rendered nonconductive causing the anode thereof and thus the control grid of cathode follower 43R to be UP whereupon output terminal 44 is UP. The inverting circuit of Fig. 9 is represented hereinafter by the symbol shown in Fig. 10.

Figure 11:
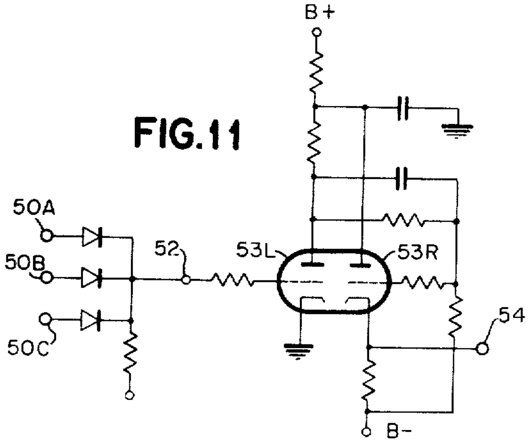
Fig. 11 illustrates the circuit diagram of an OR-Inverter circuit.
Figure 12:
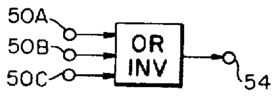
Fig. 12 illustrates the symbol used to represent the OR-Inverter of Fig. 11.

Referring to Fig. 11, an OR-Inverter is illustrated which is a circuit combining the logical functions of the OR circuit of Fig. 7 and the inverting circuit of Fig. 9. If one or more of the inputs 50A–50C of Fig. 11 is UP, juncture 52 is UP rendering inverter 53L highly conductive causing the anode thereof and thus the control grid of cathode follower 53R to be DOWN. Since the control grid of the cathode follower is DOWN, the tube is rendered less conductive causing the output terminal 54 to be DOWN. On the other hand, if all of the inputs 50A–50C of Fig. 11 are DOWN simultaneously, output terminal 54 of the OR–Inverter circuit must be UP. The OR–Inverter circuit of Fig. 11 is represented hereinafter by the symbol shown in Fig. 12.

*Modulo 4 check*

Referring more particularly to Fig. 1, a block diagram of the logical circuit of the invention is illustrated. Representations of certain electrical waveforms which must be applied to the circuit of Fig. 1 by external circuitry are illustrated in the timing charts of Figs. 2 and 3.

A word and the check digit associated therewith which are to be checked by the circuit of Fig. 1 is applied to the digit input terminals 100 in a serial fashion, digit by digit. The digit input terminals comprise four terminals labelled $\bar{1}$, $\bar{2}$, $\bar{4}$ and $\bar{8}$. The designation $\bar{1}$, for example, indicates that this terminal is UP, when the 1 bit of a digit represented in binary-decimal notation is *not* present. Similarly, the $\bar{2}$, $\bar{4}$ and $\bar{8}$ terminals, respectively, are UP when the binary bit corresponding thereto of a particular digit are not present. It is to be understood that where the signals available to digit input terminals 100 representing a digit are UP when a particular bit is present, a representation by a signal that is DOWN when the digit is present (i.e., is UP when the digit is *not* present) may be obtained by appropriately applying such signals through a group of four inverters to the digit input terminals 100 of Fig. 1. Thus the circuit of Fig. 1 may be utilized where the electrical signals available to digit input terminals 100 representing a digit are either UP when the bits of a digit are present, or conversely where the signals are DOWN when the bits of a digit are present.

Referring briefly to Fig. 2, it is indicated at the top of this drawing that a cycle during which a word and its indicator is checked, comprises eighteen digit time intervals each of which may be of, for example, fourteen microseconds duration. During digit time interval 18, the end-of-word character is applied to the digit input terminals 100 of Fig. 1. The end-of-word character is a 12 (8 bit and a 4 bit), or a 13 (8 bit, a 4 bit and a 1 bit). Where a plurality of words are stored on a magnetic tape, for example, end-of-word characters are used to separate the words and are sensed by various circuits in a calculator or auxiliary equipment to indicate that a word has been completely received or that in certain instances, a word is to follow the character. For example, in application Serial No. 471,244 filed November 26, 1954, by Weidenhammer, the character 13 is used to indicate the beginning or end of a block of information comprising a plurality of words. In said application, the character 12 is inserted between adjacent words to indicate to external circuitry the separation between two words.

During digit time interval 17 of Fig. 2, the indicated bit count check digit associated with a word appears at digit input terminals 100 of Fig. 1. The sixteen digits comprising a word successively appear on terminals 100 during the digit time intervals 16 through 1 in Fig. 2. Accordingly, when the second end-of-word character is received, it is evident that a word and its indicator have been received.

The operation of the circuit of Fig. 1 is synchronized with the operation of a calculator or auxiliary equipment by the timing of the waveforms which are illustrated in Figs. 2 and 3.

Referring briefly to Fig. 3, a breakdown of each digit time interval of Fig. 2 is illustrated. The timing chart of Fig. 3 indicates that each of the digit time intervals of Fig. 2 comprises fourteen time intervals of approximately one microsecond each. It will be noted hereinafter that during the time intervals 1 through 9 of Fig. 3, the information appearing on digit input terminals 100 of Fig. 1 is sensed and entered into the circuitry of the novel checking circuit. Although the utility of the time intervals 10 through 14 of Fig. 3 is not apparent here, it will become obvious that the circuit of Fig. 1 operates equally well with or without these time intervals and in a suitable application, said intervals could be eliminated.

In order to describe the modulo 4 or bit count check, assume that the indicated bit and count which appears during time interval 17 of Fig. 2 is currently applied to digit input terminals 100 of Fig. 1.

Since the indicated bit count is defined as the 3's complement of the sum modulo 4 of the actual number of bits present in a word, it is apparent that it can never have a value greater than 3. If the indicated bit count contains a 1 bit, the terminal $\bar{1}$ is DOWN rendering inverter 101 non-conductive so that the output thereof and thus the center input of AND circuit 102 is UP. During the first and half of the second time intervals of Fig. 3, the signal on terminal T1 is UP. In Fig. 1, the signal on Terminal T1 is applied to left-hand input of AND circuit 102. The right-hand input of this AND circuit is connected to terminal −EOW. In Fig. 2, it is indicated that the waveform appearing on terminal −EOW is UP throughout the time that the indicated bit count and the digits of a word are being applied in sequence to digit inputs 100.

Accordingly, when the indicated bit count contains a 1 bit, each of the inputs of AND circuit 102 is UP simultaneously for a brief interval during which a positive signal is applied to cathode follower 103 rendering it highly conductive so as to cause the left-hand input of OR circuit 104 to be UP. This signal renders the OR circuit operative to cause the input of inverter 105 to be UP, which in turn, renders said inverter highly conductive. When inverter 105 is rendered conductive, the output thereof goes DOWN causing the ADVANCE line 106 to go DOWN.

The ADVANCE line 106 is connected to the right-hand input of trigger K0 and to the left-hand input of each of the triggers K1, K2 and K3. Each time that the ADVANCE line is caused to go DOWN, a negative signal is applied to each of the triggers K0–K3 and is effective to cause one of them to change from its ON state to its OFF state.

Triggers K0–K3 comprise a chain of cascade connected triggers which are connected as a ring. Hereinafter the triggers are referred to as a ring counter or as a modulo 4 counter. The triggers K0, K1, K2 and K3, respectively, correspond to the decimal digits 0, 1, 2 and 3. When the ring is initially reset, the 0 trigger K0 is reset on its ON condition and the triggers K1–K3 are reset in their OFF condition. Each of the triggers is reset with the right-hand sides thereof conducting as noted by the X in the lower right-hand corner of each trigger. When the ring of triggers exist in this state, the ring is considered to be storing the digit 0.

The cascade arrangement of the triggers K0–K3 is established by the following connections: the left-hand output of K0 is connected to the right-hand input of K1; the right-hand output of K1 is connected to the right-hand input of K2; the right-hand output of K2 is connected to the right-hand input of K3; and the right-hand output of K3 is connected to the left-hand input of K0.

Consider that the ring is initially reset so that trigger K0 is ON and triggers K1–K3 are OFF. The first negative pulse applied to the ADVANCE line 106 causes a transfer of conduction to occur in trigger K0 so that the left-hand side thereof is conducting. The negative pulse on line 106 does not effect triggers K1–K3 since each of them is OFF, that is, the left-hand sides thereof are each non-conductive. The transfer of conduction in trigger K0 causes a negative pulse to be applied through lead 110 to the right-hand input of K1 causing the latter trigger to transfer conduction so that the left-hand side thereof is rendered conductive. Thus after the receipt of the first pulse, the status of the ring is trigger K1 ON and triggers K0, K2 and K3 are each OFF. Since trigger K1 is ON, the ring indicates that it is storing the digit 1.

Similarly, the receipt of a second negative pulse by ADVANCE line 106 causes trigger K1 to be turned OFF, which in turn, delivers a negative pulse via lead 111 to trigger K2 turning the latter trigger ON. In a like manner, the third negative pulse received by ADVANCE line 106 is effective to cause trigger K2 to be turned OFF and the transfer of conduction in trigger K2 delivers a negative pulse via lead 112 to trigger K3. The negative pulse on lead 112 causes K3 to be turned ON. The fourth pulse received by ADVANCE line 106, is effective to cause trigger K3 to be turned OFF. The transfer of conduction in trigger K3 applies a negative pulse through lead 113 to the left-hand input of trigger K0 which is effective to turn the latter trigger ON. Thus after receiving four negative pulses, the 0 trigger K0 is ON and triggers K1–K3 are OFF indicating the storage of the digit 0. It is now apparent that the ring of triggers K0–K3 counts 0, 1, 2, 3, 0, 1, 2, 3, etc. Because of the fact that the counter cannot count to a value greater than 3, the counter indicates the modulo 4 sum of the number of pulses applied thereto.

Returning now to a consideration of the entry of the indicated bit count appearing on inputs 100 during time interval 17 of Fig. 2, it has been established that when the indicated bit count contains a 1 bit, the terminal $\bar{1}$ is DOWN and is thus effective to apply a negative pulse to the counter during the time interval that terminal T1 is UP as indicated in Fig. 3. When the indicated bit count contains a 2 bit, the terminal $\bar{2}$ of the digit inputs 100 is DOWN causing inverter 116 to be cut off so that the output thereof is UP. The output of inverter 116 is applied to the center input of AND circuit 117, and also through cathode follower 118 to the center input of AND circuit 119.

The left-hand input of AND circuit 117 is connected to terminal T3 which is UP during the second half of the eighth and the first half of the ninth intervals of a digit time interval as shown in Fig. 3. The right-hand input of AND circuit 117 is connected to terminal −EOW which, as indicated hereinbefore, is UP throughout the time that a word and its indicated bit count is applied to digit inputs 100 (see Fig. 2). Hence when the indicated bit count contains a 2 bit, all of the inputs of AND circuit 117 are momentarily UP simultaneously causing the output thereof to be UP which renders cathode follower 103 highly conductive. The output of AND circuit 117 is connected to the output of AND circuit 102 in a common cathode OR circuit arrangement. The output of cathode follower 103 energizes OR circuit 104 which renders the input of inverter 105 UP. The inverter is then rendered conductive thereby causing a negative pulse to be applied to ADVANCE line 106, which, as stated earlier, causes the modulo 4 counter to be advanced one position.

As stated above, when the indicated bit count contains a 2 bit, terminal $\bar{2}$ is DOWN rendering inverter 116 non-conductive so that a positive signal is applied to cathode follower 118. The output of the cathode follower then causes the center input of AND circuit 119 to be UP. The left-hand input of AND circuit 119 is connected to terminal IBC which is UP during digit time interval 17 of a checking cycle as shown in Fig. 2. The right-hand input of AND circuit 119 is connected to terminal T2 which is UP during the fifth interval of each digit time interval as indicated in Fig. 3.

Coincidence is established within AND circuit 119 since each of the inputs thereof are UP during the time that the signal on terminal T2 is UP. The positive signal at the output of AND circuit 119 is applied to the right-hand input of OR circuit 104 causing the latter to render the input of inverter 105 UP. Consequently the inverter is rendered highly conductive whereupon a negative pulse is applied to ADVANCE line 106 which causes the counter to be advanced an additional position.

Reviewing briefly, the effect of the indicated bit count on the modulo 4 counter, it was noted that if the indicated bit count contains a 1 bit, terminal $\bar{1}$ is DOWN and the signal thereon is effective during the time that terminal T1 is UP (see Fig. 3) to cause a negative pulse to be applied to ADVANCE line 106. This negative pulse advances the counter from the 0 positon to the 1 position, assuming that the counter was initially reset prior to the receipt of the indicated bit count on digit inputs 100. On the other hand, when the indicated bit count does not contain a 1 bit, terminal $\bar{1}$ is UP and the modulo 4 counter is not advanced. When the indicated bit count contains a 2 bit, terminal $\bar{2}$ is DOWN causing AND circuit 119 to be rendered operative during the time interval that terminal T2 is UP (see Fig. 3) to apply a negative pulse to the ADVANCE line 106. This pulse causes the modulo 4 counter to advance one position. Thereafter, during the interval that the signal applied to terminal T3 (see Fig. 3) is UP, the DOWN signal on the $\overline{2}$ terminal renders AND circuit 117 operable so that a negative pulse is applied to ADVANCE line 106. This pulse causes the modulo 4 counter to be advanced an additional position. Note that the presence of a 1 bit in the indicated bit count causes the counter to be advanced one position, whereas the presence of a 2 bit in the indicated bit count causes the counter to be advanced two positions, i.e., first when terminal T2 is UP and second, when terminal T3 is UP. Also note that DOWN signals present on the $\overline{4}$ and $\overline{8}$ terminals during time interval 17 of any checking cycle cannot affect the modulo 4 counter.

It is now apparent that the modulo 4 counter is initially reset and immediately thereafter the indicated bit count is received at the digit input terminals 100. The modulo 4 counter is advanced a number of positions corresponding to the decimal value of the indicated bit count during time interval 17 of a checking cycle as indicated in Fig. 2.

With respect to Fig. 2, consider now that the checking cycle has advanced to the point that the digits of the word being checked are to be applied to the digit inputs 100 of Fig. 1. As noted above, the digits of the word appear successively during the digit time intervals 16 through 1 of Fig. 2. With respect to the checking circuit of Fig. 1, the operation of the circuit during each of the time intervals 16 through 1 is identical and differs only to the extent that the decimal values of the various digits comprising a word are different.

Since the waveforms illustrated in Fig. 3 occur during each and every digit time interval of a checking cycle, the circuit of Fig. 1 operates as described above when the digit being checked contains a 1 bit. That is, when a digit applied to the digit inputs 100 contains a 1 bit, terminal $\overline{1}$ is DOWN and a single negative pulse is applied to ADVANCE line 106. During each of the digit time intervals 16 through 1 of Fig. 2, the presence of a 2 bit in a digit only advances the modulo 4 counter a single position since AND circuit 119 of Fig. 1 cannot be energized during this time because of the fact that the signal on terminal IBC is DOWN as indicated in Fig. 2.

As explained earlier, a binary-decimal digit occurring during any of the digit time intervals 16 through 1 of Fig. 2 must not have a value greater than 9. Accordingly, such a digit may include a 4 bit or an 8 bit but will never contain both of them. If a digit applied to digit inputs 100 contains a 4 bit or an 8 bit, the appropriate one of the terminals $\overline{4}$ or $\overline{8}$ is DOWN (representing the presence of the bit) and the other one of said terminals is UP, the $\overline{4}$ and $\overline{8}$ terminals are respectively connected to the left and right-hand inputs of AND circuit 122. Hence when a 4 bit or an 8 bit is present, one of the inputs of AND circuit 122 is DOWN so that coincidence is not established therein and thus the output thereof is DOWN. When the output of AND circuit 122 is DOWN, inverter 123 is rendered non-conductive causing the output thereof to be UP thereby rendering cathode follower 124 highly conductive.

The positive output of cathode follower 124 is applied to the center input of AND circuit 125. The left-hand input of this AND circuit is connected to the terminal 16 DIGITS and the right-hand input thereof is connected to terminal T2. The output of AND circuit 125 is connected to the output of AND circuit 119 in a common cathode OR circuit arrangement.

Reference to the timing chart of Fig. 2 indicates that the terminal 16 DIGITS is UP only during the digit time intervals 16 through 1 of a checking cycle. Therefor, AND circuit 125 of Fig. 1 may be operated only during the time that the digits of a word are being sequentially applied to the digit inputs 100. Reference to the timing chart of Fig. 3 indicates that terminal T2 is UP only during the fifth time interval of each digit time interval. Consequently, when the center input of AND circuit 125 of Fig. 1 is UP, coincidence is established within the AND circuit during the time that terminal T2 is UP causing the output of said AND circuit to be UP. When the output of AND circuit 125 is UP, OR circuit 104 is rendered operative to cause inverter 105 to be conductive whereupon a negative pulse is applied to ADVANCE line 106. This negative pulse causes the modulo 4 counter to be advanced one position.

When the digit applied to digit inputs 100 contains neither a 4 or an 8 bit, both of the terminals $\overline{4}$ and $\overline{8}$ are UP thereby causing both of the inputs of AND circuit 122 to be UP simultaneously. The positive output of said AND circuit renders inverter 123 conductive so that the output thereof and thus the output of cathode follower 124 is DOWN. Since the output of the cathode follower is DOWN, the center input of AND circuit 125 is DOWN and hence prohibits the energization of said AND circuit. In turn, the right-hand input of OR circuit 104 remains DOWN, inverter 105 remains non-conductive, and therefor a negative pulse is not applied to ADVANCE line 106.

Note that the circuitry which operates the modulo 4 counter when a 4 and/or 8 bits are applied to digit inputs 100 of Fig. 1 does not recognize the difference between the following situations: 8 and 4 bits present simultaneously; 8 bit but no 4 bit present; and no 8 bit but 4 bit present. However, it is explained hereinafter that any difficulties encountered due to this situation are taken care of by the digit size check.

Summarizing the operation of the circuit of Fig. 1 which causes the modulo 4 counter to be advanced during the digit time intervals 16 through 1 (see Fig. 2), the presence of a 1 bit in a digit causes terminal $\overline{1}$ to be DOWN and the signal thereon is effective to render AND circuit 102 operative, which in turn, is effective to cause a single negative pulse to be applied to ADVANCE line 106. When the digit contains a 2 bit, terminal $\overline{2}$ is DOWN and the signal thereon is effective to energize AND circuit 117. A positive signal at the output of AND circuit 117 is effective to cause a single negative pulse to be applied to ADVANCE line 106. When a digit contains a 4 or an 8 bit, AND circuit 122 is rendered inoperative and thus causes a single negative pulse to be applied to ADVANCE line 106. Accordingly, if a digit applied to digit inputs 100 contains one, two or three binary bits, the modulo 4 counter is respectively advanced one, two or three positions. Note that during digit time interval 17 of Fig. 2 the presence of a digit on digit inputs 100 causes the modulo 4 counter to be advanced a number of positions equal to the value of the digit, whereas during the digit time intervals 16 through 1, the operations of a digit on digit inputs 100 causes the modulo 4 counter to be advanced a number of positions equal to the actual number of bits contained in said digit irrespective of the weighted values of said bits.

In order to illustrate the operation of the checking circuit of Fig. 1 as described thus far, consider that the word 63421 is to be checked. As noted hereinbefore, the indicated bit count that must be associated with the quantity 63421 is 0. Therefore, the quantity being checked will actually appear as 063421. During digit time interval 17 of Fig. 2, the indicated bit count of 0 is applied to digit inputs 100 causing the modulo 4 counter to be advanced 0 positions. During the digit time interval 16, the digit 6 is applied to digit inputs 100 and since it contains a 4 bit and a 2 bit, the modulo 4 counter is advanced two positions. The digit 3 is applied to digit inputs 100 during digit time interval 15 and the presence of a 2 bit and a 1 bit comprising said digit 3 causes the modulo 4 counter to be advanced two additional positions. Since the counter has been advanced four positions, the status thereof is now as follows: Trigger K0 is ON and triggers K1–K3 are OFF. During digit time interval 14 of Fig. 2, the digit 4 is applied to digit inputs 100. The digit 4 is represented by the presence of a 4 bit which causes the modulo 4 counter to be advanced one position and thus now indicates the storage of the value 1. During the thirteenth and twelfth digit time intervals of Fig. 2, the digits 2 and 1 are respectively consequently applied to digit inputs 100. Because of the fact that each of said digits are represented by a single binary bit, each digit causes the modulo 4 counter to be advanced one position. The condition of the counter now is such that trigger K3 is ON and triggers K0, K1 and K2 are OFF. During the remaining digit time intervals 11 through 1 of Fig. 2, let it be assumed that 0's are applied to the digit inputs 100 for the sake of simplifying the present example.

The left-hand output of trigger K3 of the modulo 4 counter is connected to the input of cathode follower 127 and the output of said cathode follower is connected to the left-hand input of AND circuit 128. The right-hand input of AND circuit 128 is connected to terminal T4 and the center input thereof is connected to terminal 129. Terminal T4 is UP during the last 4.5 microseconds of digit time interval 1 as illustrated in Fig. 2. Terminal 129 of Fig. 1 is connected to external circuitry of an electronic calculator or other apparatus and must be UP in order to permit AND circuit 128 to render an error signal. With respect to the present application, consider that terminal 129 is UP whenever the circuit of Fig. 1 is utilized to check information applied to digit inputs 100.

At the completion of a checking cycle, trigger K3 of the modulo 4 counter is ON providing that the indicated bit count and the word associated therewith are in agreement as indicated in the previous example. When trigger K3 is ON, the left-hand output thereof is DOWN rendering cathode follower 127 less conductive so that the left-hand input of AND circuit 128 is DOWN. Due to the fact that one of the inputs of this AND circuit is DOWN, coincidence cannot be established therein during the time interval that terminal T4 is UP.

However, if the word and the check digit (indicated bit count) associated therewith are not in agreement, trigger K3 will be OFF at the end of the checking cycle. When trigger K3 is OFF the left-hand output thereof is UP rendering cathode follower 127 highly conductive, whereupon the left-hand input of AND circuit 128 is UP. If coincidence is established within AND circuit 128, the output thereof and thus terminal 130 goes UP indicating that a modulo 4 error exists, that is, that the word and its indicator are not in agreement.

*Resetting the modulo 4 counter*

The modulo 4 counter is reset during the eighteenth digit time interval of each checking cycle. The counter may also be reset by the depression of a manual switch as described hereinbelow.

Referring to Fig. 2, terminal T5 is UP during the first 7.5 microseconds of the eighteenth digit time interval of each checking cycle. During said eighteenth interval the end-of-word character is being applied to the digit input terminals of Fig. 1 as noted previously. The end-of-word character does not enter into the computation performed in order to check the validity of each word applied to the digit input terminals 100.

In Fig. 1 the signal appearing on terminal T5 is applied to cathode follower 135. The output of the cathode follower is applied to power inverter 136 where the output of inverter 136 is connected to the lead 137. Lead 137 is the common reset line and is connected to the reset terminal of each of the trigger circuits K0, K1, K2 and K3.

Accordingly, when terminal T5 is UP during the eighteenth digit interval of each checking cycle, cathode follower 135 is rendered highly conductive causing the output thereof and thus the input of power inverter 136 to be UP. Inverter 136 is then rendered conductive causing the output thereof to go DOWN and thus apply negative direction pulses to each of the triggers.

The negative pulse on lead 137 resets each of the triggers K0, K1, K2 and K3 so that the right-hand tubes thereof are rendered conductive.

The effect then of each pulse appearing on terminal T5 is to reset the modulo 4 counter so that at the beginning of each checking cycle the counter is reset so as to be storing the digit zero.

When the operating power supply potentials are initially applied to the circuit of Fig. 1 the triggers K0 through K3 may be turned ON indiscriminately. The modulo 4 counter may be initially reset by depressing the manual reset switch 138. The closure of this switch causes a potential of +10 volts to be applied to cathode follower 139 which renders the latter highly conductive. The output of this cathode follower is connected to the output of cathode follower 135 in a common cathode OR circuit arrangement to the input of power inverter 136. Accordingly, when cathode follower 139 is rendered highly conductive, a negative pulse appears on reset line 137 which resets each of the triggers K0 through K3.

*Digit size check*

During the seventeenth digit time interval of each checking cycle, the digit applied to the digit input terminals 100 is the indicated bit count which is also examined by the circuit of Fig. 1 to determine if the value thereof is greater than the digit 3.

Referring to Fig. 1, terminal IBC is connected to the left-hand input of AND circuit 140. It has been noted hereinbefore that terminal IBC is UP throughout the seventeenth digit time interval of each checking cycle. The right-hand input of AND circuit 140 is connected to the output of cathode follower 124. It is recalled that the output of this cathode follower is UP when the digit applied to the digit input terminals contains a 4 bit or an 8 bit and is also UP when said digit contains a 4 bit and an 8 bit simultaneously. Since the indicated bit count should never have a value greater than 3, it is in error if it contains a 4 bit or an 8 bit, or both of them.

If both of the inputs of AND circuit 140 are UP simultaneously, coincidence occurs therein and causes the second from the right-hand input of AND circuit 141 to be UP. The output of AND circuit 141 is connected to terminal 142. When this terminal is UP a digit size error has occurred, that is, the value of the digit applied to the digit input terminals 100 is of a magnitude which is not permissible in the calculator or auxiliary equipment. The extreme left-hand input of AND circuit 141 is connected to terminal 129 which as stated earlier, is UP whenever the circuit of Fig. 1 is to perform the checking functions described herein. The extreme right-hand input of AND circuit 141 is connected to terminal T2 which is UP during the fifth interval of each time interval as indicated in Fig. 3. For the present, consider that the second from the left-hand input of AND circuit 141 is UP indicating that the digit applied to the digit inputs is not the character 15 as will be described shortly. Accordingly, after the output of AND circuit 140 is UP (indicating that the indicated bit count consists of a digit greater than 3) and the remaining inputs of AND circuit 141 are each UP during the interval that terminal T2 is UP, the output of AND circuit 141 is UP causing terminal 142 to be UP. As noted, terminal 142 is UP when the digit applied to digit inputs 100 is greater than a permissible magnitude (a digit size error has occurred).

The checking circuit of Fig. 1 also examines each digit applied to digit inputs 100 during the digit time intervals 16 through 1 of each checking cycle (see Fig. 2) to determine if the value of each digit is greater than 9. If one or more of these digits is of a value greater than 9, the word contains a digit size error.

Referring to Fig. 1, the output of OR-Inverter circuit 145 is UP if the digit applied to digit inputs 100 contains a value greater than 9.

Since a greater-than-9 check should not be performed during the eighteenth digit time interval of each checking cycle the output of OR-inverter 145 of Fig. 1 must be DOWN during said eighteenth interval. The right-hand input of OR-Inverter 145 is connected to terminal +EOW which is UP only during the eighteenth digit time interval of each checking cycle as illustrated in Fig. 2. Accordingly, during this time interval the output of OR-Inverter 145 is caused to be DOWN. The output of this unit is connected to the outputs of AND circuit 140 and OR-Inverter 156 in a common cathode OR circuit arrangement. Hence, when the output of OR-Inverter 145 is DOWN and the outputs of units 140 and 156 are DOWN, the second input from the right of AND circuit 141 is DOWN thereby prohibiting energization of AND circuit 141. The center input of OR-Inverter 145 is connected to the $\overline{8}$ terminal of digit inputs 100. Thus, when the digit applied to the inputs does not contain an 8 bit, the $\overline{8}$ terminal is UP causing the output of OR-Inverter 145 to be DOWN. However, if the digit appearing on the digit input terminals 100 contains an 8 bit, terminal $\overline{8}$ is DOWN and OR-Inverter 145 may then be rendered operative if the left-hand input to unit 145 is UP.

The left-hand input of OR-Inverter 145 is connected to the output of AND circuit 146. The purpose of this AND circuit is to render a positive output signal when the digit applied to inputs 100 contains an 8 bit but does not contain a 2 bit or a 4 bit. The left-hand input of AND circuit 146 is connected to the terminal which is UP whenever the digit being checked does not contain a 2 bit. Similarly, the center input of AND circuit 146 is connected to the $\overline{4}$ terminal which is UP when the digit being checked does not contain a 4 bit. The $\overline{8}$ terminal is connected to the input of inverter 147, the output of which is applied to the right-hand input of AND circuit 146. When the digit applied to inputs 100 contains an 8 bit terminal $\overline{8}$ is DOWN rendering inverter 147 non-conductive so that the output thereof, and thus the right-hand input of AND circuit 146, is UP.

Accordingly, the three inputs of AND circuit 146 are UP simultaneously when the digit applied to inputs 100 contains an 8 bit, but does not contain a 4 bit or a 2 bit, that is, the digit is an 8 or 9. Coincidence within AND circuit 146 causes the output thereof to go UP which causes the output of OR-Inverter 145 to go DOWN indicating that the digit being checked does not have a value greater than 9.

It was stated previously, that the checking circuit of Fig. 1 must distinguish between the situation wherein significant data is being applied to digit inputs 100 and the situation occurring when no data is being applied to said terminals. For example, in certain situations where no data is being applied to the digit inputs 100, each of the terminals $\overline{1}$, $\overline{2}$, $\overline{4}$ and $\overline{8}$ may be DOWN which would tend to indicate that the character 15 is being applied thereto. It was noted previously that where the digit representing the indicated bit count and each of the digits of a word is the character 15, the Modulo 4 Counter indicates that a valid word has been checked, since the indicated bit count corresponds to the word.

In this situation, the Modulo 4 Counter is responsive only to the 1 bit and the 2 bit of the indicated bit count character 15. The reason that the counter does not sense the 4 and 8 bits of a character 15 which occupies the position of the indicated bit count is that AND circuit 125 of Fig. 1 cannot be operated during the seventeenth digit interval of a checking cycle since the terminal 16 DIGITS is DOWN during this interval. It was also noted above that if the indicated bit count contains a value greater than 3, AND circuit 140 of Fig. 1 is operated to attempt to energize AND circuit 141. Thus, in order to prohibit AND circuit 141 from being energized when the indicated bit count and each of the digits of a word is a 15, the second from the left-hand input of AND circuit 141 must be DOWN. As explained hereinbelow, the second from the left input of AND circuit 141 is DOWN only when the digit being checked is the character 15.

The purpose of AND circuit 150 of Fig. 1 is to render a positive output signal when the digit checked is the character 15. The left-hand input of AND circuit 150 is connected to the output of inverter 116 which is UP whenever the digit applied to inputs 100 contains a 2 bit (terminal $\overline{2}$ is DOWN). The center input of AND circuit 150 is connected to the output of inverter 101 which is UP when the digit being checked contains a 1 bit (terminal $\overline{1}$ is DOWN). The right-hand input of AND circuit 150 is connected to the output of AND circuit 151 which will be UP whenever the digit being checked contains a 4 bit and an 8 bit.

When the digit applied to digit inputs 100 contains an 8 bit, terminal 8 is DOWN rendering inverter 147 non-conductive whereupon the output thereof and the right-hand input of AND circuit 151 is UP. If said digit contains a 4 bit, terminal 4 is DOWN causing inverter 152 to be cut off. When inverter 152 is cut off the output thereof is UP which causes the left-hand input of AND circuit 151 to be UP. Hence, when the digit applied to digit inputs 100 contains a 4 bit and an 8 bit simultaneously, both of the inputs of AND circuit 151 are UP causing coincidence to occur therein, thereby applying a positive signal to the right-hand input of AND circuit 150.

It is now apparent that coincidence occurs within AND circuit 150 and the output thereof is UP whenever the digit being checked is the character 15. The output of AND circuit 150 is applied to the input of inverter 153 and the output of said inverter is connected to the second from the left-hand input of AND circuit 141.

In summary, when the digit applied to digit inputs 100 is the character 15, AND circuit 150 is rendered operative to render inverter 153 conductive so that the output of the inverter is DOWN. When the output of inverter 153 is DOWN, coincidences cannot be established within AND circuit 141.

In the situation referred to above where significant data is not being applied to the digit inputs 100, but the information received by said inputs appears to be a series of the character 15, AND circuit 150 is effective to prevent the rendition of a digit size error signal. However, if during the time that a character 15 should have been received a character having a value other than 15 actually was received the Modulo 4 Counter may not detect the error but it will be detected by the circuit including AND circuit 150.

During the eighteenth digit time interval of each checking cycle (see Fig. 2) the circuit of Fig. 1 is operative to determine if the digit received is the character 12 (8 bit and 4 bit present) or the character 13 (8 bit, 4 bit and 1 bit present). The end-of-word character used in the calculator or auxiliary equipment with which the checking circuit of Fig. 1 is associated is always the character 12 or the character 13.

It was stated previously that the output of AND circuit 151 of Fig. 1 is UP when the digit being checked contains a 4 bit and an 8 bit. The output of this AND circuit is applied to the left-hand input of AND circuit 155. The right-hand input of AND circuit 155 is connected to $\overline{2}$ terminal of digit inputs 100 and thus is UP whenever the digit being checked does not contain a 2 bit.

Accordingly, both of the inputs of AND circuit 155 can be UP only when the digit being checked is the character 12 or the character 13. The output of AND circuit 155 is connected to the left-hand input of OR-Inverter 156, the output of which is connected in a common cathode OR circuit arrangement to the outputs of AND circuit 140 and OR-Inverter 145. Thus, if the digit being checked is the character 12 or 13, the output of AND circuit 155 is UP rendering OR-Inverter 156 operative so that the output thereof is DOWN. When the output of OR-Inverter 156 is DOWN, the second from the right input of AND circuit 141 may be DOWN thereby prohibiting the rendition of a digit size error signal on terminal 142.

The right-hand input of OR-Inverter 156 is connected to terminal —EOW which is DOWN only during the eighteenth digit time interval of each checking cycle (see Fig. 2). It is apparent that the signal on terminal —EOW is DOWN only during the time interval that the end-of-word character may be applied to digit inputs 100. Thus OR-Inverter circuit 156 is rendered ineffective at all other times since the output thereof is DOWN during said other times.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A checking circuit for determining if a check digit and a word expressed in binary-decimal rotation are in agreement comprising: a ring counter including a series of cascade connected triggers; means responsive to only the 1 and 2 bits of said check digit to enter the combined value of said bits into said counter; circuit means responsive to each bit of said word to advance said counter one position for each bit received; AND circuit means responsive to said check digit to render a signal if said digit contains a 4 bit or an 8 bit; and, circuit means responsive to the condition of the highest order trigger of said ring to indicate whether said check digit and said word are correlated by a predetermined mathematical relationship.

2. A checking circuit for determining whether a multi-digit position word expressed in binary-decimal notation and the check digit of said word are in accord comprising: a ring counter for computing sums modulo 4; means for entering the value of the indicated bit count into said counter; means for adding the bits of said word to said indicated bit count within said counter to render a sum modulo 4; and means responsive to said counter at a predetermined time interval for indicating when said last-mentioned sum is other than the value 3.

3. A checking circuit for determining the corelation of a check digit having a predetermined relationship to the composition of a digital word expressed in binary-decimal notation, comprising; a counting ring having a predetermined number of elements and connected to count 0, 1, 2, 3, 0, 1, 2, 3, etc.; circuit means receiving said check digit to advance said counter one position or two positions respectively when said check digit includes a 1 bit or a 2 bit; further circuit means receiving each digit of said word to advance said ring one position for each bit included in each digit regardless of the value assigned to each bit; additional circuit means for indicating if said check digit and each digit of said word are greater than predetermined values; and means responsive to said counter to determine if the final position thereof is indicative of the digit 3.

4. A checking circuit for checking the corelation of a check digit and a multi-digit number, each expressed in binary notation, including: first means serially receiving said check digit and said multi-digit number, digit by digit; an electronic modulo 4 counter; means for resetting said counter at the conclusion of each checking cycle; circuit means responsive to said first means only when said check digit is received to advance said counter to the value of said check digit, including means for indicating an error if the value of said check digit is greater than a predetermined amount; additional circuit means responsive to said first means only when the digits of said multi-digit number are received to advance said counter one position for each binary bit received, including means for indicating an error if the value of any digit is greater than a predetermined amount; and means sensing the status of said counter at the conclusion of each checking cycle to render an error signal when the value contained therein is not a preselected value.

References Cited in the file of this patent

UNITED STATES PATENTS

| | | |
|---|---|---|
| Re. 23,601 | Hamming | Dec. 23, 1952 |
| 1,972,326 | Angel | Sept. 4, 1934 |
| 2,521,774 | Bliss | Sept. 12, 1950 |
| 2,596,199 | Bennett | May 13, 1952 |
| 2,621,854 | Sprague | Dec. 16, 1952 |
| 2,634,052 | Block | Apr. 7, 1953 |
| 2,653,996 | Wright | Sept. 29, 1953 |
| 2,689,950 | Bayliss et al. | Sept. 21, 1954 |
| 2,765,982 | Knutsen | Oct. 9, 1956 |
| 2,826,359 | Deerhake | Mar. 11, 1958 |

UNITED STATES PATENT OFFICE

CERTIFICATE OF CORRECTION

Patent No. 2,955,756 October 11, 1960

Robert A. Jensen

It is hereby certified that error appears in the printed specification of the above numbered patent requiring correction and that the said Letters Patent should read as corrected below.

Column 4, line 10, for "-50 volts" read -- +50 volts --; column 8, line 60, strike out "and"; column 16, line 18, for "terminal 8" read -- terminal $\bar{8}$ --; line 21, for "terminal 4" read -- terminal $\bar{4}$ --; column 17, line 28, for "rotation" read -- notation --.

Signed and sealed this 25th day of April 1961.

(SEAL)

Attest:

ERNEST W. SWIDER

Attesting Officer

DAVID L. LADD

Commissioner of Patents